United States Patent [19]

Davidson

[11] Patent Number: 5,624,173

[45] Date of Patent: Apr. 29, 1997

[54] VIDEO FRAME SYSTEM

[76] Inventor: Steven Davidson, P.O. Box 1181, Back Bay Station, Boston, Mass. 02117

[21] Appl. No.: 618,641

[22] Filed: Mar. 19, 1996

[51] Int. Cl.⁶ .................................................. G03B 21/14
[52] U.S. Cl. ............................................................ 353/119
[58] Field of Search .............................. 353/72, 79, 119; 312/10.1; 248/917, 918, 919, 920

[56] References Cited

U.S. PATENT DOCUMENTS

| | | |
|---|---|---|
| 1,863,309 | 6/1932 | Kitts . |
| 2,614,457 | 10/1952 | Weber .................................... 88/24 |
| 4,097,136 | 6/1978 | Astarloa ................................ 353/71 |
| 4,549,798 | 10/1985 | Dieckhoff ............................. 353/72 |
| 4,959,798 | 9/1990 | Gordon et al. ..................... 364/513 |
| 5,160,951 | 11/1992 | Lander ................................. 353/79 |
| 5,211,456 | 5/1993 | Staffaroni ........................... 312/10.1 |
| 5,278,595 | 1/1994 | Nishida et al. ..................... 353/78 |
| 5,349,400 | 9/1994 | Kaplan et al. ..................... 353/119 |

*Primary Examiner*—William Dowling
*Attorney, Agent, or Firm*—Nields & Lemack

[57] ABSTRACT

A portable video frame system. A projector such as an LCD lightweight projector is removably mounted to a triangular top frame portion. Support brackets are removably mounted to this top frame portion and to a rear frame portion. The rear frame portion is itself supported on a base having sufficient weight to support the entire assembly. Optionally, at least a portion of the weight is provided by necessary ancillary equipment, such as speakers. A conventional snap screen snaps onto the rear frame portion, and is always the same distance from the projector. The entire assembly can be readily disassembled and moved to a different location.

8 Claims, 5 Drawing Sheets

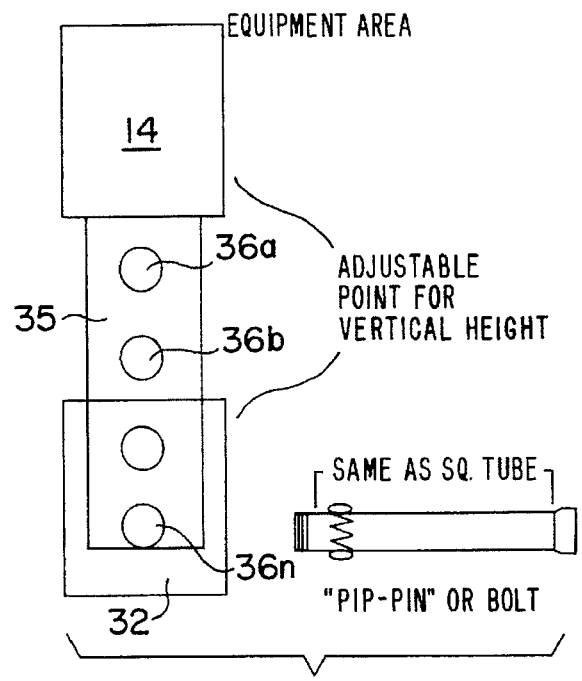
FIG. 5
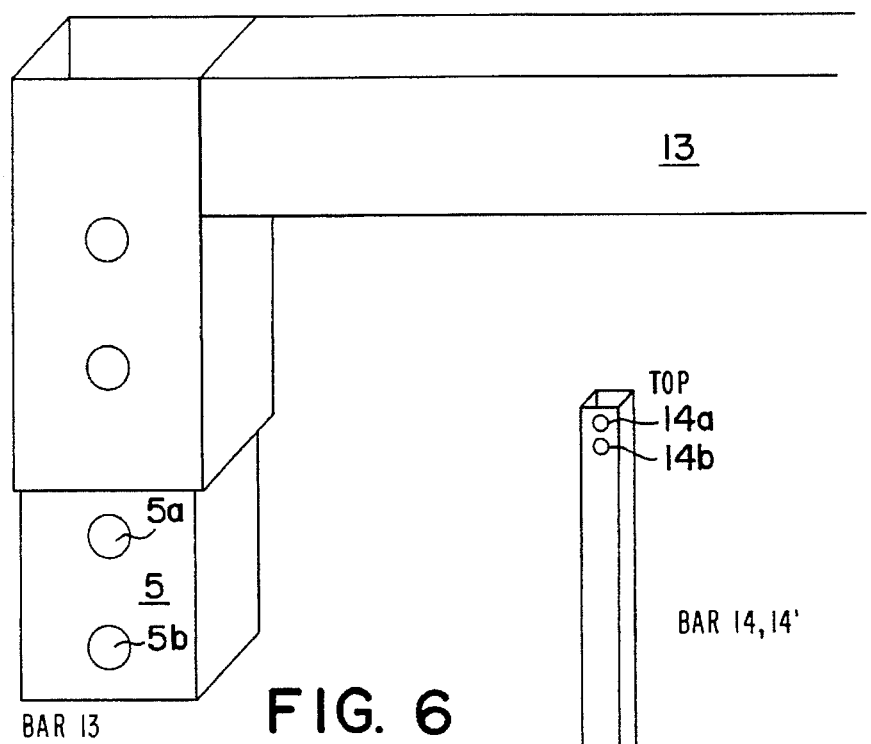
FIG. 6
FIG. 6A 5,624,173

VIDEO FRAME SYSTEM

BACKGROUND OF THE INVENTION

The present invention relates to multifunctional projection equipment, and more particularly to a portable video projector frame system.

Conventional front video projector systems permanently mount the projector to the ceiling or some other fixed structure. This severely limits the options for locating the screen or substrate onto which the image from the projector is to be projected, as the screen must be placed a predetermined and specific distance from the projector to obtain an acceptable focused video image. Moreover, the permanently mounted projector eliminates the portability of the system.

It is therefore an object of the present invention to provide a video projector frame system which is easy to install, and which eliminates the requirement of permanently mounting the projector to a fixed structure such as a ceiling.

It is a further object of the present invention to provide a portable video projector frame system which houses and supports the projector, screen, and audio/video equipment and which can be readily assembled and disassembled for ease of transport.

It is a still further object of the present invention to provide a video projector frame system which can be semi-permanently installed if desired.

SUMMARY OF THE INVENTION

The problems of the prior art have been overcome by the present invention, which provides a portable video frame system. More specifically, a projector such as an LCD lightweight projector is removably mounted to a triangular top frame portion. Support brackets are removably mounted to this top frame portion and to a rear frame portion. The rear frame portion is itself supported on a base having sufficient weight to support the entire assembly. Optionally, at least a portion of the weight is provided by necessary ancillary equipment, such as speakers. A conventional snap screen snaps onto the rear frame portion, and is always the same distance from the projector. The entire assembly can be readily disassembled and moved to a different location.

BRIEF DESCRIPTION OF THE DRAWINGS

FIG. 5 is a front view of a portion of the frame system in accordance with the present invention;

FIG. 6 is a perspective view of the top portion of the frame system in accordance with the present invention;

FIG. 6A is a perspective view of the side portion of the frame system in accordance with the present invention;

DETAILED DESCRIPTION OF THE INVENTION

Figure 1:
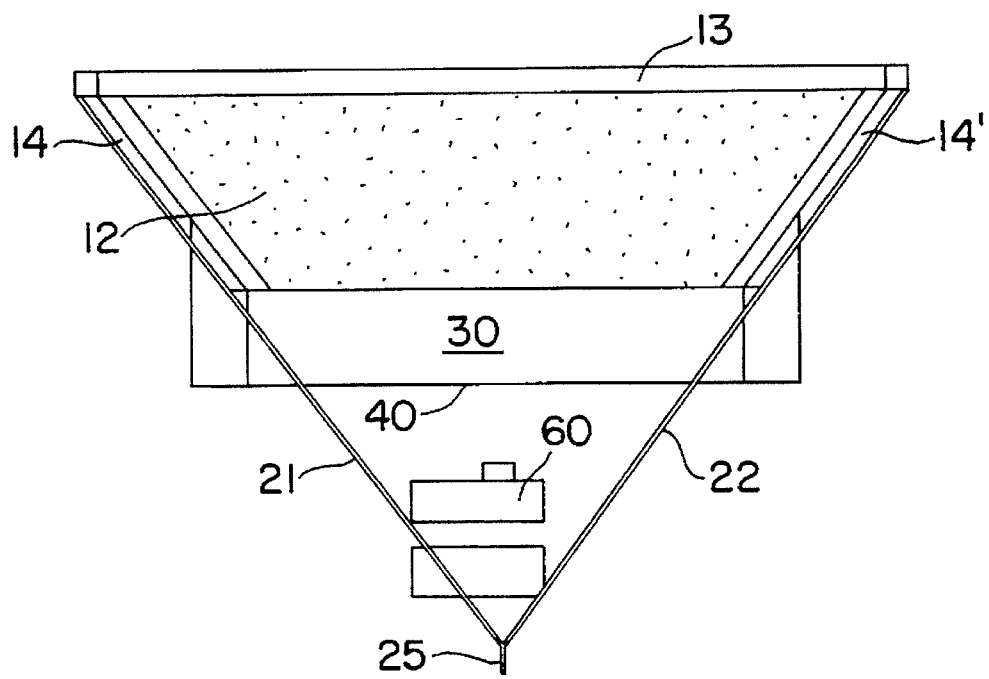
FIG. 1 is a top view of the video frame in accordance with the present invention.
Figure 3:
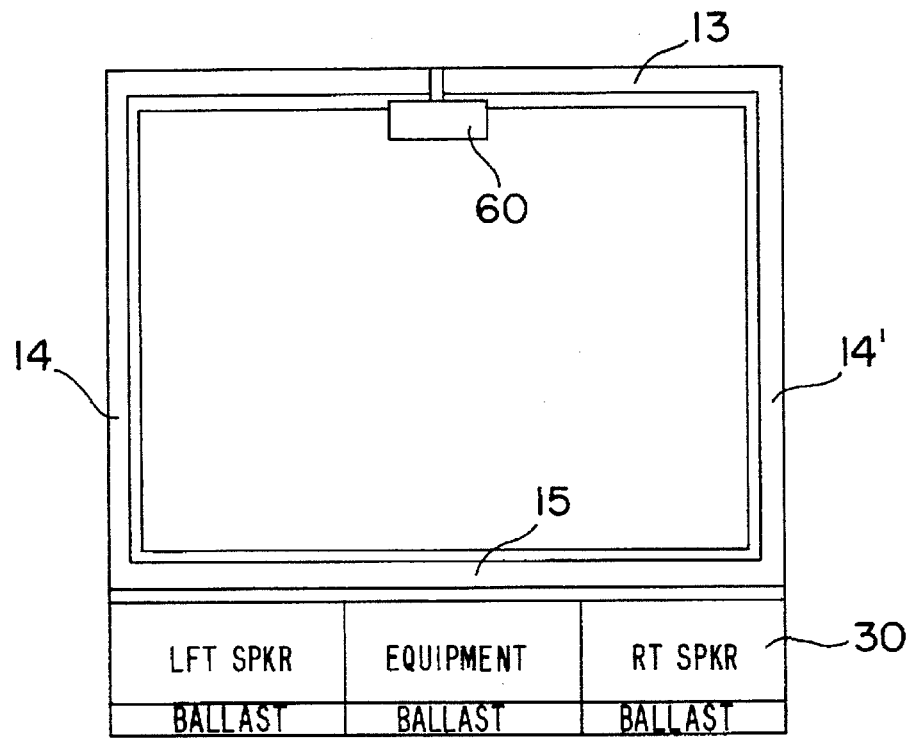
FIG. 3 is a front view of the video frame in accordance with the present invention.

Turning first to FIG. 1, there is shown a frame system generally at 30. The frame system 10 includes a rear wall 12 which provides a surface for the image from a projector to be projected. For example, a conventional video screen suitable for supporting either front or rear projection can be mounted on rear wall 12, the screen preferably being a commercially available "snap screen", which allows for ease in assembly and disassembly of the system. In the embodiment shown, the rear wall 12 has a diagonal of sixty inches, although it should be understood by those skilled in the art that other sizes can be used, depending upon the image size desired. The rear wall 12 is generally rectangular in shape, and includes a top bar 13, side bars 14 and 14' extending downwardly and orthogonally from the top bar 13, and base bar 15 (FIG. 3). Preferably the frame system is constructed of 1"×1" aluminum square tubing, and is welded at the non-movable joints.

Assembly of the frame system is accomplished as follows. Each end of top bar 13 terminates in a right-angled welded angle, as shown in FIG. 6. An intermediate member 5 extends from each end of the welded angle, the intermediate member being smaller in cross-section than either top bar 13 or side bars 14, 14'. The intermediate member is then received by the side bars 14, 14' and is locked in place by aligning apertures 5a, 5b in the intermediate member 5 with apertures 14a, 14b in side bars 14, 14' (FIG. 6A), and by inserting a pip-pin, bolt, or the like through the apertures. In the case of assembly top bar 13 to side bars 14, 14', gravity acts to retain top bar 13 in place, and thus the aforementioned locking system is optional, though preferable, in order to ensure a stable frame.

In addition, bars 13 and 15 optionally can be halved, preferably at their respective centers, and the respective halves can be assembled using smaller-dimensioned intermediate members in a manner similar to the assembly of bars 13 and 14 above. This construction allows for disassembly of the unit into smaller parts.

Figure 4:
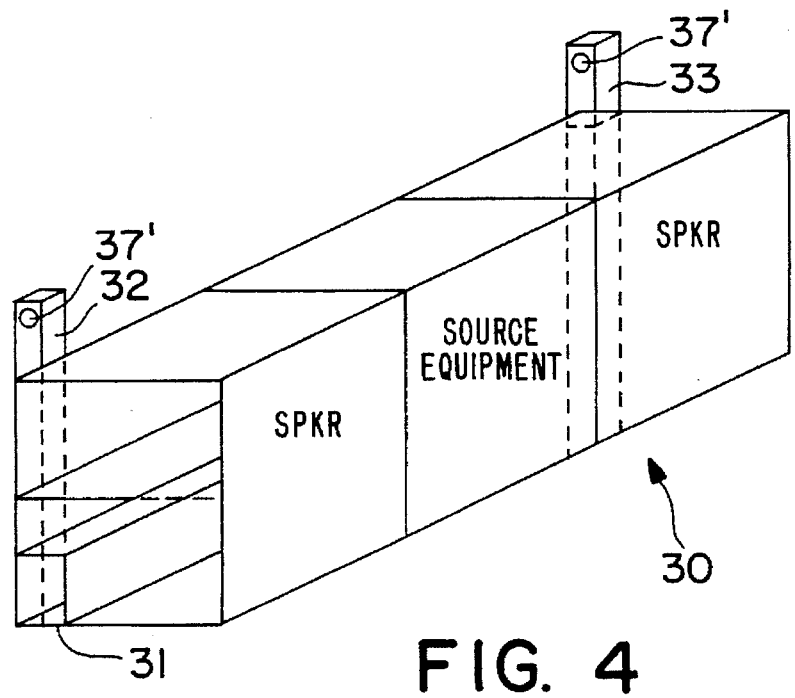
FIG. 4 is a perspective view of the base of the video frame in accordance with the present invention.

Turning now to FIG. 4, there is shown the base 30 of the frame assembly. Preferably the base 30 is configured so as to house ancillary equipment, such as speakers and source equipment. Such equipment also serves to add weight to the base 30, which supports the frame assembly. In addition, a ballast compartment 31 can be formed in the base unit 30, such as with aluminum tubing, and can be filled with suitable weights. Extending from the top of the base 30 are feet 32, 33. The feet 32, 33 are hollow, and have a cross-section sufficient to slidingly receive the respective side bars 14, 14' of the frame 10 in a manner similar to the assembly of top bar 13 into side bars 14, 14'. Specifically, with reference to FIG. 5, an intermediate member 35 extends from the bottom of each side bar 14, 14', the intermediate member being smaller in cross-section than either the side bars 14, 14' or the feet 32, 33. To assemble the frame 10 onto the base 30, the intermediate members 35 are slid into the feet 32, 33. The frame assembly 10 can then be adjusted to an appropriate vertical height by aligning apertures 36a–36n formed in the intermediate members 35 with the apertures 37, 37' formed in the feet 32, 33, respectively, and inserting a pip-pin, bolt or the like to lock the side bars in place. Alternatively, where the vertical height so dictates, the side bars 14, 14' can simply sit at the bottom of feet 32, 33, respectively, requiring no aperture alignment, although preferably they are locked in place in the manner discussed above.

Figure 2:
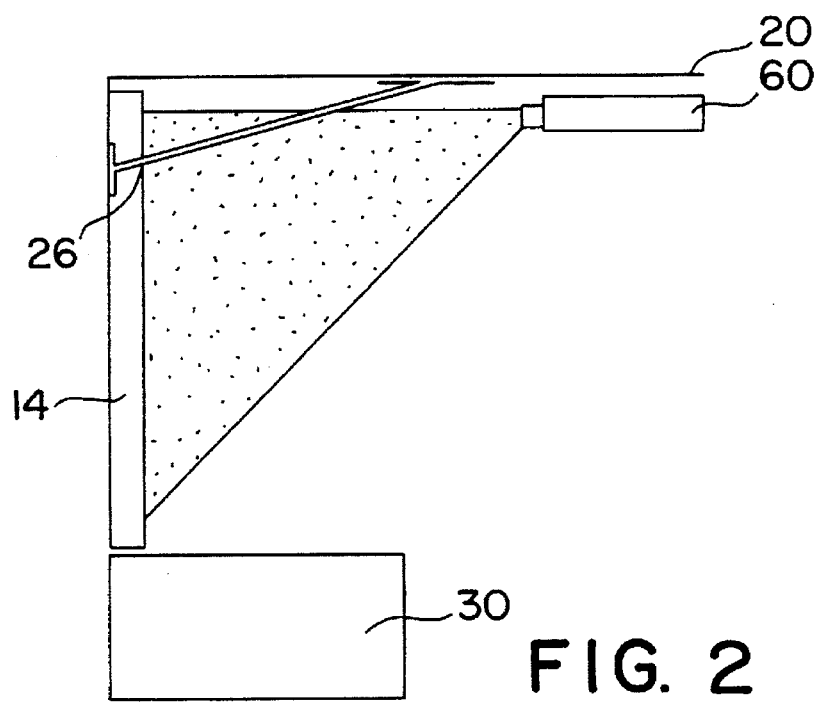
FIG. 2 is a side view of the video frame in accordance with the present invention.
Figure 7:
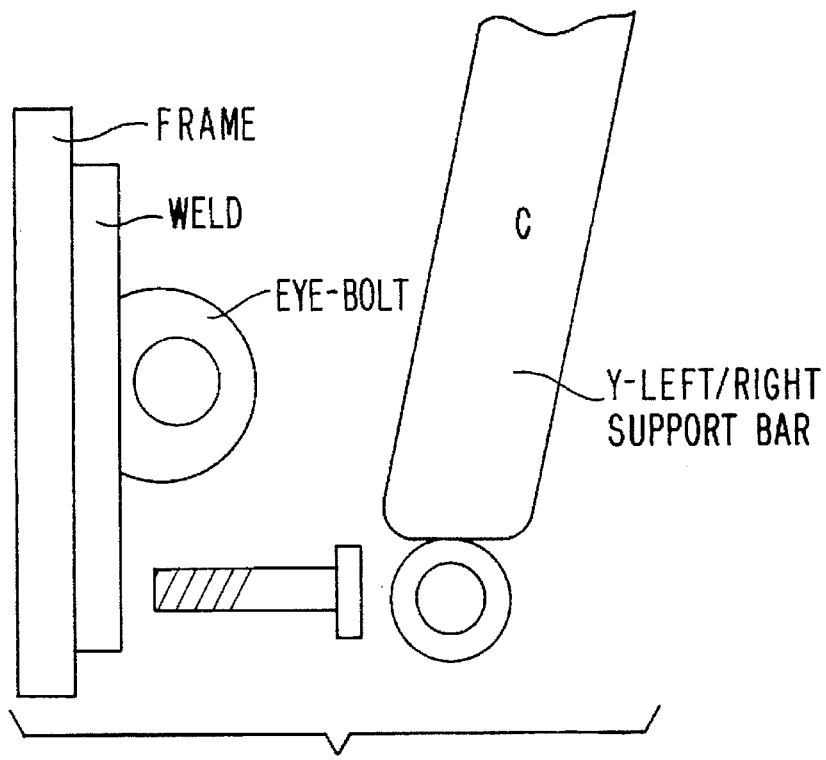
FIG. 7 is a schematic view detailing the eye-bolts used to assemble the frame system of the present invention.
Figure 10:
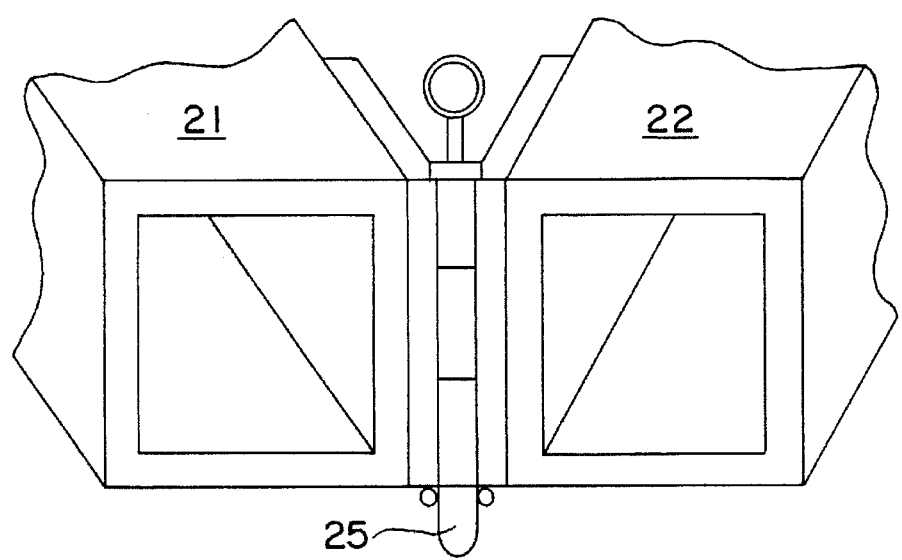
FIG. 10 is a perspective view of the hinge for the V-support in accordance with one embodiment of the present invention.

Extending outwardly from the rear wall 12 is video projector support frame 20. The support frame 20 includes a first arm 21 and a second arm 22, preferably of equal length and constructed of 1"×1" aluminum tubing. One end of each arm 21, 22 is removably secured to the frame 12, such as to side bars 14, 14', in a manner similar to the manner in which top bar 13 is secured to side bars 14, 14'. Thus, each such end of arms 21, 22 terminates in a right-angled welded angle, and has an intermediate section of lesser cross-section extending therefrom that is received by side bars 14, 14'. The opposite ends of each arm 21, 22 are joined together at a hinged joint 25 (FIG. 10). A pair of support brackets 26, 26' (FIG. 2, only one shown) are removably secured at one end to each arm 21, 22, and at the other end to respective side bars 14, 14'. Preferably each bracket 26, 26' terminates at each end in an eyebolt (FIG. 7), which can then be aligned with corresponding eyebolts located on the underside of each arm 21, 22 and on each side bar 14, 14' to secure the brackets 26, 26' thereto. A horizontal cross bar 40 (FIG. 1), preferably made of 1"×1" square tubing, is coupled at each end to arms 21, 22 by suitable bolting to the V-frame (21, 22), and is used to provide additional support. The horizontal cross bar 40 is itself coupled to legs 41, 42 at its opposite ends, which legs terminate at the rear wall 12 by fastening to bars 14, 14', respectively. A suitable video projector 60 is mounted to the support frame 20 at a predetermined position using suitable mounting brackets well known to those skilled in the art. Preferably the video projector weighs less than about 50 pounds.

Figure 8:
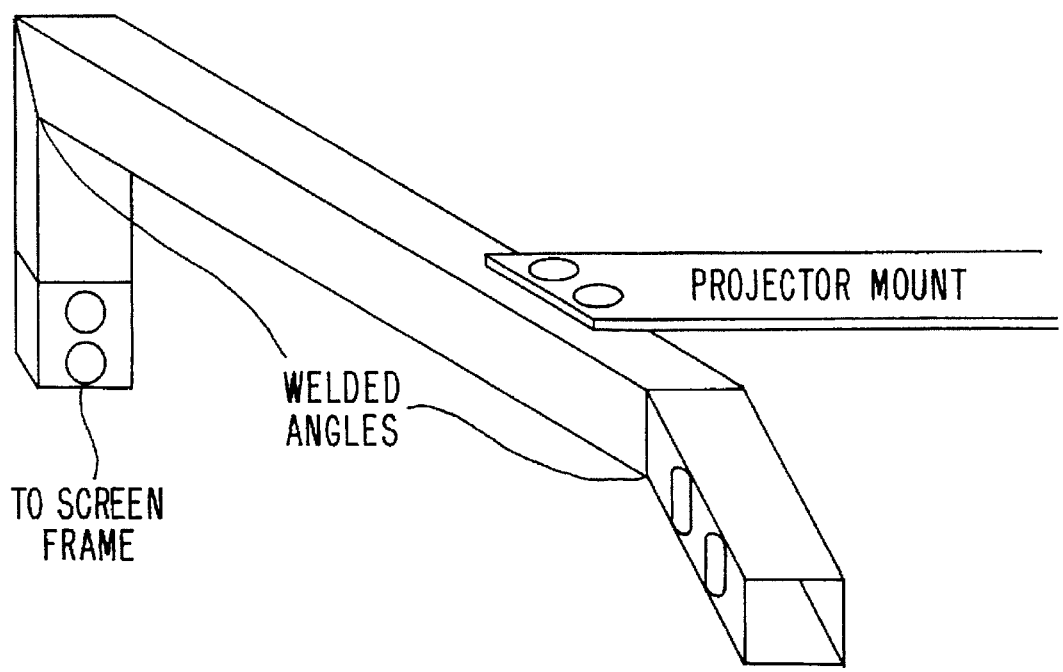
FIG. 8 is an alternative preferred embodiment of the video projector support in accordance with the present invention.

FIG. 8 shows an alternative, preferred embodiment of the arms 21, 22 of support frame 20. This embodiment is similar to the embodiment of FIG. 1, except that the arms when assembled are configured so as to form a Y-frame. Thus, welded angles 40, 40' (only one shown) are formed beyond the projector mount, and are apertured as shown. Welded angles 40, 40' can thus be aligned and locked in place by inserting pins or the like through the apertures, which provides for ease of assembly and disassembly of the frame system.

Figure 9:
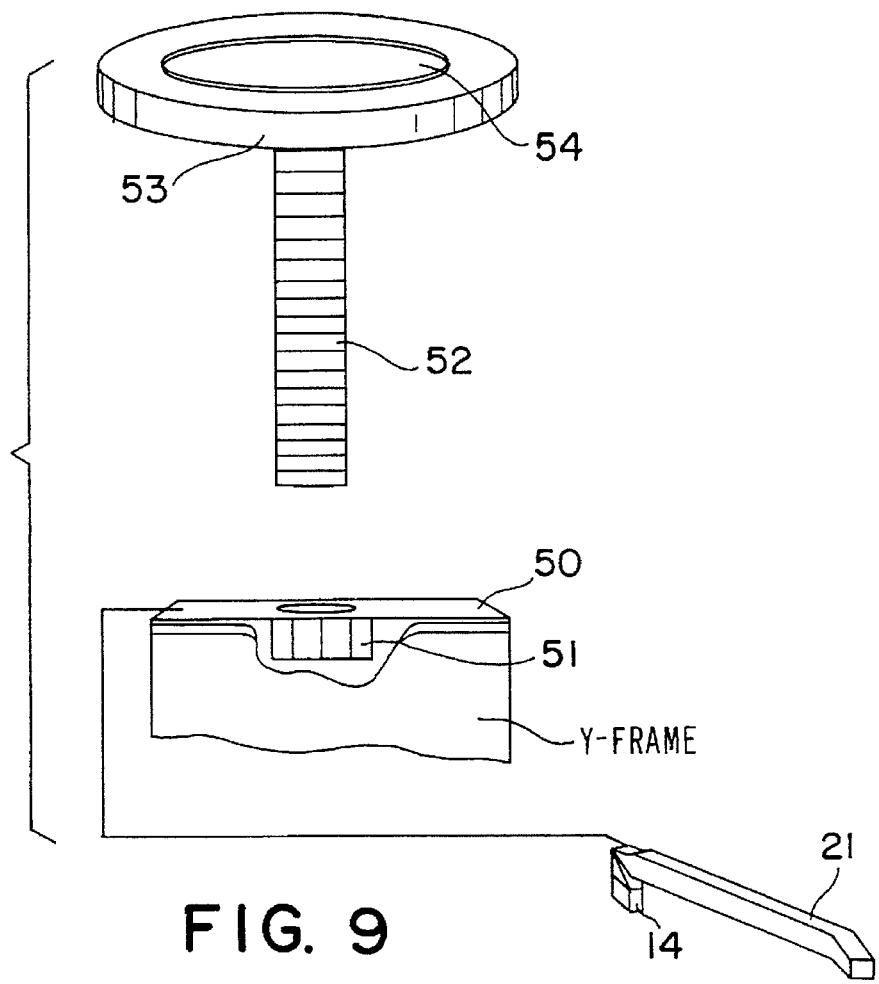
FIG. 9 is a schematic view of a stabilization mechanism in accordance with the present invention.

FIG. 9 depicts a further embodiment of the present invention used to provide additional stability to the frame system. A plate 50 is coupled to the top of one of the Y-frames, preferably where the Y-frame inserts into the side bar 14 or 14'. A nut 51 is coupled to the underside of the plate and inside the Y-frame, and is adapted to receive a threaded stem 52 which terminates in a knob 53 having a rubber pad 54 or the like on its upper surface. Once the frame system 10 is assembled, the height of the knob 53 can be adjusted by rotation so that the rubber pad 54 engages the ceiling or other fixed structure and stabilizes the system.

What is claimed is:

1. A portable video frame system, comprising:

video projector image receiving means having a surface and defining a rear vertical plane;

a V-shaped video projector top support frame extending substantially orthagonally from said rear vertical plane for removable mounting of a video projector at a spaced and predetermined distance from said image receiving means; and a base providing a support for said video projector receiving means and said top support frame.

2. The portable video frame system of claim 1, further comprising a rear frame on which said image receiving means is removably mounted.

3. The portable video frame system of claim 2, wherein said top support frame is removably mounted on said rear frame.

4. The portable video frame system of claim 3, wherein the apex of said V comprises a hinge.

5. The portable video frame system of claim 3, wherein the apex of the V of said top support frame comprises a hinge, which together with said V-shaped top support frame, forms a Y-shape.

6. The portable video frame system of claim 2, wherein said rear frame comprises a top horizontal frame member removably attached to a pair of vertical side frame members, said pair of vertical side frame members being supported by said base.

7. The portable video frame system of claim 6, wherein each of said top horizontal frame member and said vertical side frame members are hollow and have a first cross-section, and wherein said top horizontal frame member is attached to each of said vertical side frame members with a pair of intermediate sections having a cross-section less than said first cross section.

8. The portable video frame system of claim 1, wherein said base comprises a plurality of defined chambers for housing equipment associated with said video projector and for housing a ballast, said equipment and said ballast providing the weight necessary to stabilize said system.

* * * * *